(12) United States Patent
Coscarella

(10) Patent No.: US 7,665,486 B2
(45) Date of Patent: Feb. 23, 2010

(54) TEAR OUT TEST PLUG FOR PLUMBING INSTALLATIONS

(76) Inventor: Gabe Coscarella, 15703 - 64 Street NW, Edmonton, AB (CA) T5Y 2N5

( * ) Notice: Subject to any disclaimer, the term of this patent is extended or adjusted under 35 U.S.C. 154(b) by 0 days.

(21) Appl. No.: 12/369,675

(22) Filed: Feb. 11, 2009

(65) Prior Publication Data

US 2010/0012211 A1   Jan. 21, 2010

(30) Foreign Application Priority Data

Jul. 21, 2008   (CA) .................................. 2638501

(51) Int. Cl.
*F16L 55/10* (2006.01)
*G01M 3/04* (2006.01)

(52) U.S. Cl. ........................ 138/90; 138/94; 137/68.19; 137/68.25; 137/68.21; 137/68.28; 220/265; 220/270; 73/49.8; 73/49.5

(58) Field of Classification Search .................... 138/90, 138/89, 92; 137/68.19, 68.27, 68.25, 68.21; 137/68.28; 220/265, 270, 380
See application file for complete search history.

(56) References Cited

U.S. PATENT DOCUMENTS

| | | | |
|---|---|---|---|
| 1,933,117 A | 10/1933 | Markle | |
| 3,635,234 A | 1/1972 | Dawson | |
| 3,654,965 A | 4/1972 | Gramain | |
| 3,815,779 A | 6/1974 | Ludwig | |
| 3,844,585 A | 10/1974 | Sands | |
| 4,329,857 A | 5/1982 | Kittle | |
| 4,429,568 A | 2/1984 | Sullivan | |
| 4,436,310 A | 3/1984 | Sawabe | |
| 4,542,642 A | 9/1985 | Tagliarino | |
| 4,602,504 A | 7/1986 | Barber | |
| 4,706,482 A | 11/1987 | Barber | |
| 4,763,510 A | 8/1988 | Palmer | |
| 4,784,284 A * | 11/1988 | Miyauchi et al. | 220/270 |
| 4,830,214 A * | 5/1989 | Curliss et al. | 220/270 |
| 4,834,825 A | 5/1989 | Adams | |
| 4,848,155 A | 7/1989 | Huber | |
| 4,850,503 A | 7/1989 | Larsson | |
| 4,863,306 A | 9/1989 | Muenzer | |
| 4,902,043 A | 2/1990 | Zillig | |
| 4,936,350 A | 6/1990 | Huber | |
| 4,961,511 A * | 10/1990 | Piltz | 220/270 |

(Continued)

FOREIGN PATENT DOCUMENTS

GB   2 216 063 A   10/1989

OTHER PUBLICATIONS

"Palmer's Rip Plug Testing System," © 2008 Palmer's Plastics, <http://www.ripplug.com/rip_testplug_cord.htm> [retrieved May 22, 2009], 3 pages.

*Primary Examiner*—Patrick F Brinson
(74) *Attorney, Agent, or Firm*—Christensen O'Connor Johnson Kindness PLLC

(57) ABSTRACT

A tear out test plug for plumbing installations includes a cylindrical body having a peripheral sidewall, a closed end and an open end. A positioning flange extends outwardly from the peripheral sidewall at the open end. An end wall closes the closed end. A frangible strip extends from the open end, down the peripheral sidewall, and across at least a portion of the end wall.

11 Claims, 5 Drawing Sheets

U.S. PATENT DOCUMENTS

| | | |
|---|---|---|
| 5,033,510 A | 7/1991 | Huber |
| 5,078,429 A | 1/1992 | Braut |
| 5,106,127 A | 4/1992 | Briet |
| 5,163,480 A | 11/1992 | Huber |
| 5,353,943 A | 10/1994 | Hayward |
| 5,507,501 A | 4/1996 | Palmer |
| 5,624,123 A * | 4/1997 | Meyers ............ 277/604 |
| 5,711,536 A | 1/1998 | Meyers |
| 6,032,515 A | 3/2000 | Huber |
| 6,082,183 A | 7/2000 | Huber |
| 6,085,362 A | 7/2000 | Huber |
| 6,085,363 A | 7/2000 | Huber |
| 6,234,007 B1 | 5/2001 | Pampinella |
| 6,267,001 B1 | 7/2001 | Duncan |
| 6,564,823 B1 | 5/2003 | Mankins |
| 6,575,475 B1 | 6/2003 | Duncan |
| 6,588,454 B1 | 7/2003 | Johnson |
| 6,595,242 B2 | 7/2003 | Duncan |
| 6,637,464 B1 | 10/2003 | Cornwall |
| 7,325,573 B2 | 2/2008 | Coscarella |
| 7,472,912 B2 * | 1/2009 | Duncan ............ 277/609 |
| 2004/0129327 A1 | 7/2004 | Hooper |

* cited by examiner

TEAR OUT TEST PLUG FOR PLUMBING INSTALLATIONS

FIELD

Test plug for plumbing installations for leaks that tears out when testing is completed.

BACKGROUND

U.S. Pat. No. 5,507,501 (Palmer) and 6,575,475 (Duncan) both disclose apparatus used in testing plumbing installations for leaks that use sealing discs which are weakened by grooves. When testing is completed, a lug secured to the sealing disc is grasped and a force exerted to tear the sealing disc along the grooves. The Palmer reference teaches securing such a sealing disc in place using a wax seal or glue. The Duncan reference incorporates such a sealing disc into a pipe coupling.

SUMMARY

There is provided a tear out test plug for plumbing installations comprises a cylindrical body having a peripheral sidewall, a closed end and an open end. A positioning flange extends outwardly from the peripheral sidewall at the open end. An end wall closes the closed end. A frangible strip extends from the open end, down the peripheral sidewall, and across at least a portion of the end wall.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
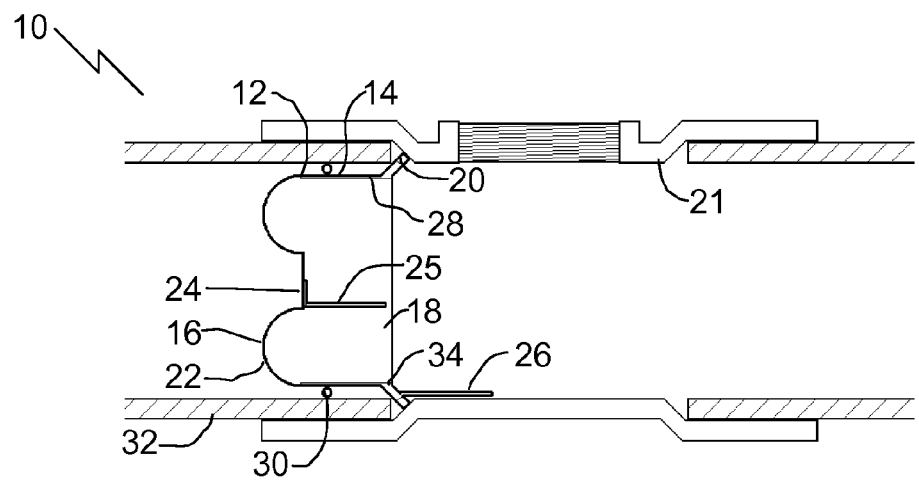
FIG. 1 is a side view in section of a tear out test plug for plumbing installations.

A tear out test plug for plumbing installations generally identified by reference numeral 10, will now be described with reference to FIGS. 1 through 6, and 10-13.

Figure 5:
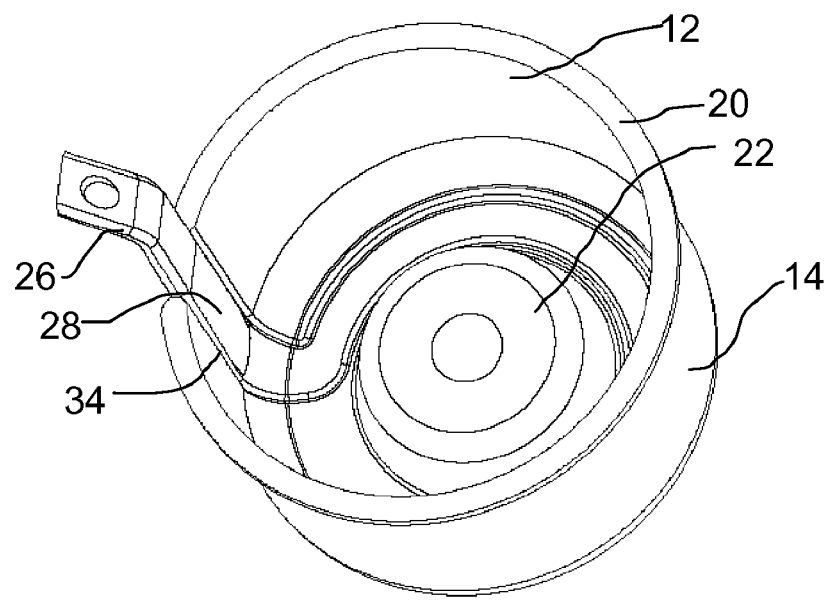
FIG. 5 is a perspective view of the tear out test plug of FIG. 1.

Structure and Relationship of Parts:

Referring to FIGS. 1 and 5, tear out test plug 10 has a cylindrical body 12 having a peripheral sidewall 14, a closed end 16 and an open end 18. A flange 20 extends outwardly from peripheral sidewall 14 at open end 18. Flange 20 is preferably used to help position cylindrical body 12 within a pipe 32, and in the depicted embodiment, acts as a stop ledge against the inner surface of a fitting 21. Flange 20 may be a solid ring as depicted, or it may be a broken ring to facilitate removal in some circumstances. An end wall 22 closes closed end 16. A removable plug 24, such as a frangible plug, may be centrally positioned in end wall 22, and includes a gripping portion 25, which may be a cord attached to plug 24, a handle integrally formed, or other similar structure. FIG. 5 depicts an embodiment where plug 24 is not included. Plug 24 is included if there is the possibility that the plumbing system may need to be retested, where the hole left by plug 24 can be plugged again, either with the same or with a different plug. Plug 24 may also be used when a slow drain down is desired to help avoid a potential mess. If it is known that a retest is not needed, then plug 24 need not be included.

Figure 2:
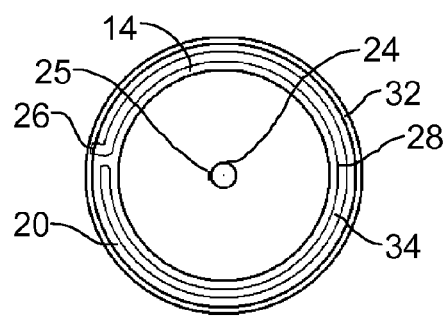
FIG. 2 is an end elevation view of the tear out test plug of FIG. 1.
Figure 10:
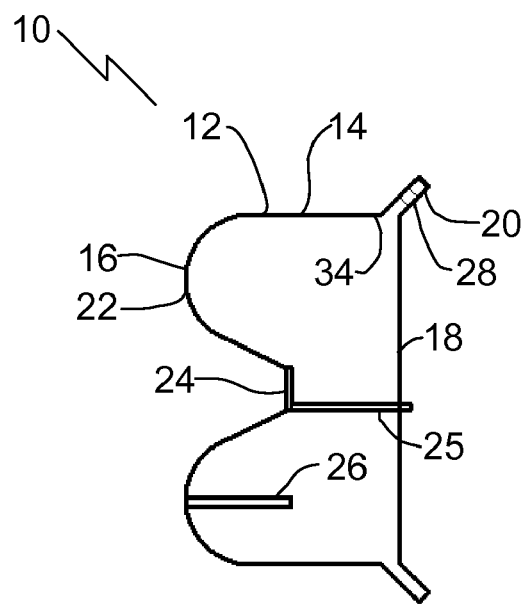
FIG. 10 is a side view in section of an alternative tear out test plug.
Figure 11:
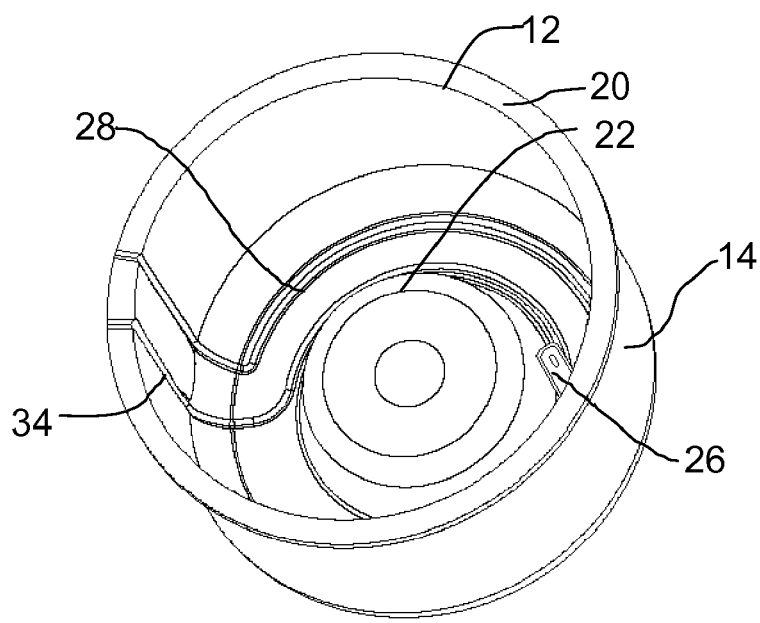
FIG. 11 is a perspective view of the tear out test plug of FIG. 10.
Figure 12:
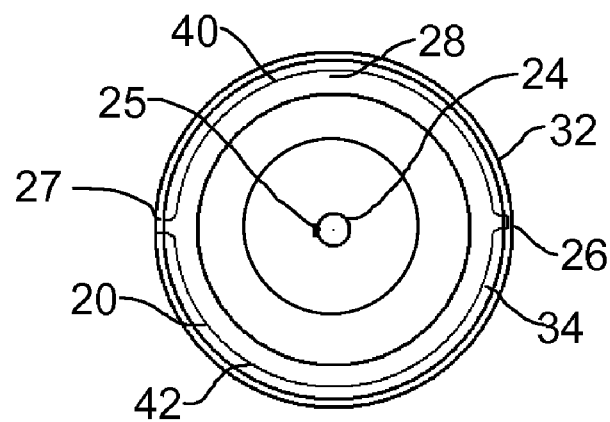
FIG. 12 is a top plan view of an alternative tear out test plug.
Figure 13:
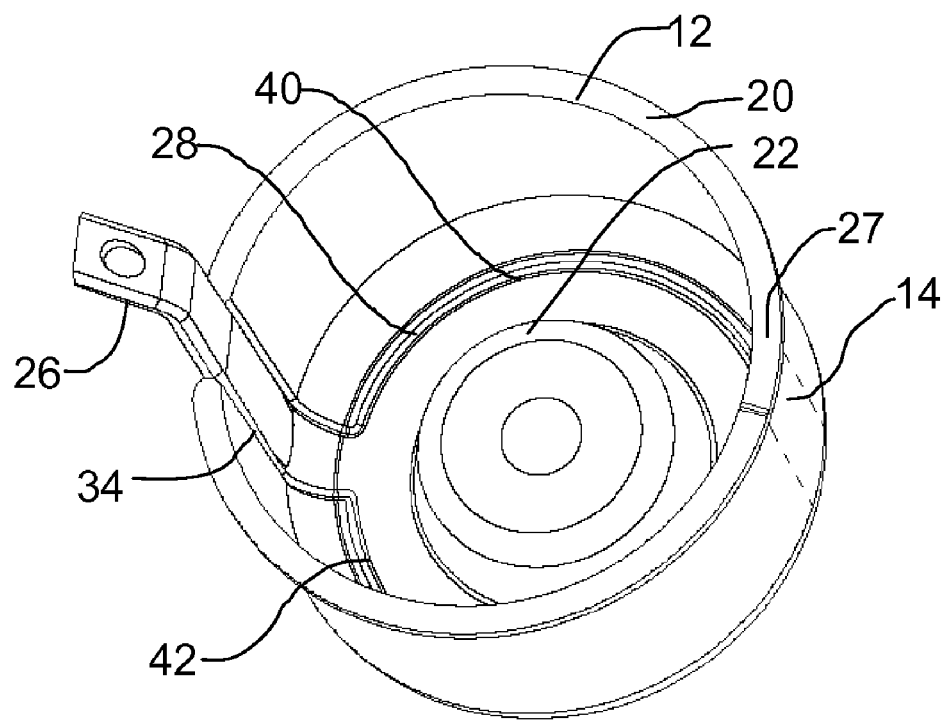
FIG. 13 is a perspective view of the alternative tear out test plug of FIG. 12.

Referring to FIG. 2, a frangible strip 28 extends from open end 18, across flange 20 down peripheral sidewall 14, and across at least a portion of end wall 22. Frangible strip 28 may also extend up peripheral sidewall 14 and across flange 20 toward open end 18. Preferably, referring to FIGS. 12 and 13, a portion 27 of the end of frangible strip 28 is connected to test plug body 12, such that a pulling force may be applied to the test plug once the frangible strip has been removed. The attached portion 27 may be at open end 18 as shown, or at closed end 16, depending on where frangible strip 28 ends. Frangible strip 28 has a gripping portion 26 that is positioned to begin the tearing at either the open end 18 as shown in FIG. 5, or to begin tearing at the other end of frangible strip 28, namely, end wall 22 as shown in FIGS. 10 and 11. In the example shown in FIG. 5, gripping portion 26 extends past open end 18. The design of frangible strip 28 is intended to permit tear out test plug 10 to collapse. Thus, frangible strip 28 extends up or down at least one side of peripheral sidewall 14, and along at least a portion of end wall 22 to allow test plug 10 to collapse and be removed from the plumbing installation. As can be seen from the drawings, side wall 22 is sufficiently large that it can be distinguished from end wall 22 and from flange 20. In addition, it can be seen that frangible strip 28 also tears a portion of flange 20, such that the entire test plug 20 can be removed, without leaving a portion of flange 20 or sidewall 14.

It has been found that in some circumstances, frangible strip 28 may break prematurely as it progresses around a curve, such as those shown in and is forced to twist. To prevent this, it may be desirable to design frangible strip 28 to pass along a straight line from one side of cylindrical body 12 to the other. This may be done by providing frangible strip 28 with straight sides, or by curving in opposite directions and approaching again at the other side. For example, referring to FIGS. 12 and 13, this may be done by having the first side edge 40 and the second side edge 42 of frangible strip 28 encompass closed end 16, such that closed end 16 is substantially removed with frangible strip 28.

Figure 3:
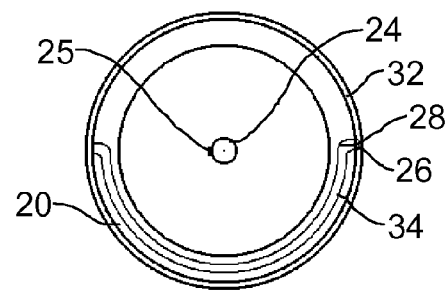
FIG. 3 is an end elevation view of an alternative tear out test plug.
Figure 4:
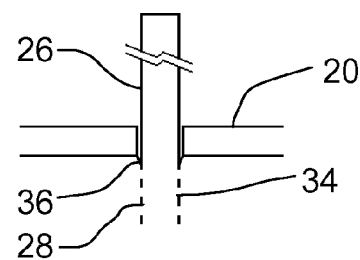
FIG. 4 is a detailed view of a frangible strip and gripping portion.

If frangible plug 24 is included, the portion of frangible strip 28 that extends across end wall 22 may be positioned along peripheral sidewall 14. In one embodiment, frangible strip 28 extends almost completely around a circumference defined by peripheral sidewall 14, as shown in FIG. 2. In another embodiment, frangible strip 28 extends part way around peripheral side wall 14 as shown in FIG. 3. Referring to FIG. 4, frangible strip 28 may be defined by a scored line 34 or other means of weakening cylindrical body 12, such that frangible strip 28 will tear or break along line 34. To help ensure frangible strip 28 pulls along the correct direction to begin with, indents 36 may be provided.

Figure 6:
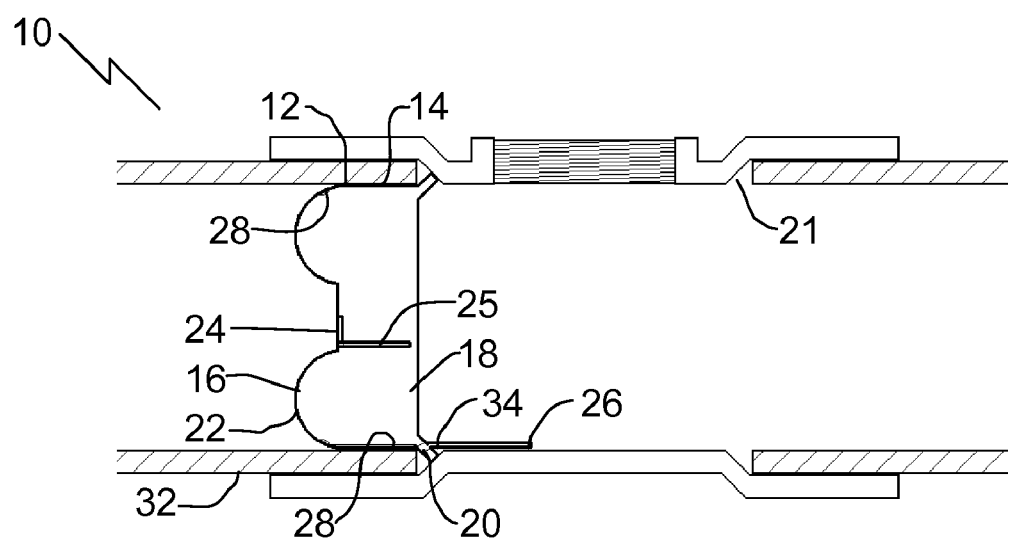
FIG. 6 is a side view in section of an alternative tear out test plug.

Operation:

Referring to FIG. 1, cylindrical body 12 may be installed by first inserting cylindrical body 12 into a pipe 32 such that peripheral sidewall engages the inner surface of pipe 32, and connecting pipe 32 to a fitting 21, such that flange 20 acts as a stop ledge against fitting 21 to prevent the removal of cylindrical body 12. Body 12 may be sealed within pipe 32 using any known sealing technique that is suitable in such a situation. For example, a seal 30, such as an O-ring seal or a wax seal, may be provided around peripheral sidewall 14 as shown in FIG. 1, or peripheral sidewall 14 may be friction fit into a pipe 32 as shown in FIG. 6. Depending on the shape of end wall 22, the friction fit may become tighter as pressure is applied, such as if a curved surface is used.

Once installed, the plumbing system of which pipe 32 is a part of may be pressure tested. Once the pressure test is complete, either end wall 22 or frangible plug 24 is removed. If used, frangible plug 24 may be removed by pulling on gripping portion 25 to open a passageway. The passageway may be closed using a plug if further testing is desired. End wall 22 is removed by pulling on frangible strip 28 to tear away a portion of flange 20 or peripheral sidewall 14. As indicated, strip 28 generally follows the circumference of cylindrical body 12, and goes part or most of the way around. Frangible strip 26 tears or breaks along scored line 34, but preferably remains connected at the other end. Once frangible strip 26 has been pulled away from cylindrical body 12, the corresponding portion of flange 20 is no longer supported, such that further application of force will remove cylindrical body 12.

Figure 7:
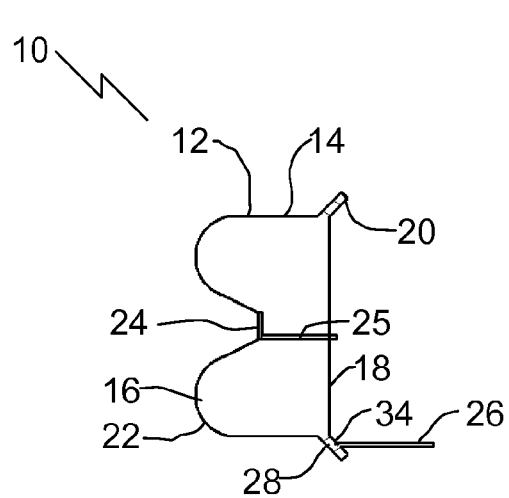
FIGS. 7 through 9 are side views in section of alternative tear out test plugs.
Figure 8:
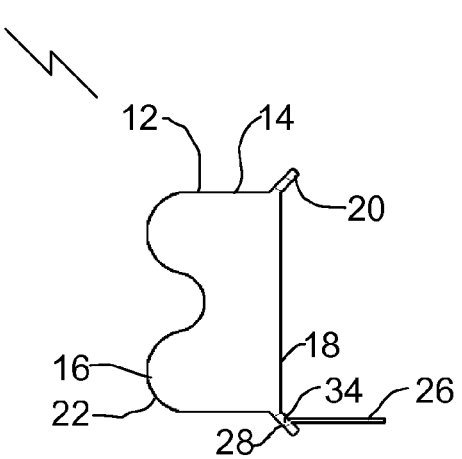
Figure 9:
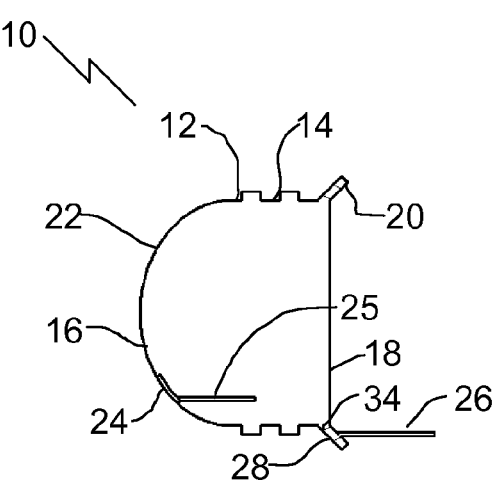

Variations:

It will be understood that the shape of end walls 22 may be varied, some examples of which are shown in FIGS. 7 through 9.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A tear out test plug for plumbing installations, comprising:
    a hollow cylindrical body having, a closed end, an open end axially spaced from the closed end, and a peripheral sidewall that extends for a distance between the closed end and the open end;
    a positioning flange extending outwardly from the peripheral sidewall at the open end;
    an end wall closing the closed end; and
    a frangible strip extending from the open end, down the peripheral sidewall, and across at least a portion of the end wall.

2. The tear out test plug of claim 1, wherein the frangible strip has a gripping portion that extends past the open end.

3. The tear out test plug of claim 1, wherein the frangible strip comprises a gripping portion that begins tearing the frangible strip at the open end.

4. A tear out test plug for plumbing installations, comprising:
    a cylindrical body having a peripheral sidewall, a closed end, and an open end;
    a positioning flange extending outwardly from the peripheral sidewall at the open end;
    an end wall closing the closed end; and
    a frangible strip extending from the open end, down the peripheral sidewall, across at least a portion of the end wall and up the peripheral sidewall toward the open end.

5. A tear out test plug for plumbing installations, comprising:
    a cylindrical body having a peripheral sidewall, a closed end, and an open end;
    a positioning flange extending outwardly from the peripheral sidewall at the open end;
    an end wall closing the closed end; and
    a frangible strip extending from the open end, down the peripheral sidewall, and across at least a portion of the end wall, wherein a portion of the frangible strip is connected to the cylindrical body at an end of the frangible strip, such that a pulling force may be applied to the test plug once the frangible strip has been removed.

6. The tear out test plug of claim 4, wherein the frangible strip ends at the end wall, and comprises a gripping portion that begins tearing the frangible strip at the end wall.

7. The tear out test plug of claim 4, wherein the frangible strip comprises a first side edge and a second side edge, the first side and the second side edge encompassing the closed end such that the closed end is substantially removed with the frangible strip.

8. The tear out test plug of claim 4, wherein the peripheral sidewall engages an inner surface of the plumbing installation.

9. A tear out test plug for plumbing installations, comprising:
    a cylindrical body having a peripheral sidewall, a closed end, and an open end;
    a positioning flange extending outwardly from the peripheral sidewall at the open end;
    an end wall closing the closed end; and
    a frangible strip extending from the open end, down the peripheral sidewall, and across at least a portion of the end wall, wherein a removable plug centrally is positioned in the end wall and that portion of the frangible strip extending across the end wall is positioned along the peripheral sidewall.

10. The tear out test plug of claim 4, wherein the frangible strip extends almost completely around a circumference defined by the peripheral sidewall.

11. The tear out test plug of claim 9, wherein the removable plug has a gripping portion that extends past the open end.

* * * * *